United States Patent [19]
Dragone et al.

[11] Patent Number: 5,235,658
[45] Date of Patent: Aug. 10, 1993

[54] METHOD AND APPARATUS FOR CONNECTING AN OPTICAL FIBER TO A STRIP WAVEGUIDE

[75] Inventors: Corrado Dragone, Little Silver; Herman M. Presby, Highland Park, both of N.J.

[73] Assignee: AT&T Bell Laboratories, Murray Hill, N.J.

[21] Appl. No.: 860,477

[22] Filed: Mar. 30, 1992

[51] Int. Cl.$^5$ .......................... G02B 6/10; G02B 6/30
[52] U.S. Cl. ........................................ 385/50; 385/39
[58] Field of Search ................... 385/50, 39, 24, 52

[56] References Cited

U.S. PATENT DOCUMENTS

| | | | |
|---|---|---|---|
| 4,813,755 | 3/1989 | Mannscake | 385/70 X |
| 4,883,743 | 11/1989 | Booth et al. | 385/50 X |
| 5,062,681 | 11/1991 | Furmanak et al. | 385/50 |

OTHER PUBLICATIONS

"Fiber Attachment for Guided Wave Devices," E. J. Murphy, J. Lightwave Technology, vol. 6, No. 6, Jun. 1988.

"Efficient Multichannel Integrated Optics Star Coupler on Silicon" C. Dragone, et al., IEEE Photonics Tech. Lett., vol. 1, No. 8, Aug. 1989.

"Integrated Four-Channel Mach-Zehnder Multi/-Demultiplexer Fabricated with Phosphorous Doped $SiO_2$ Waveguides on Si" B. H. Verbeek, et al., J. of Lightwave Tech., vol. 6, No. 6, Jun. 1988.

Primary Examiner—Akm E. Ullah
Attorney, Agent, or Firm—E. Weiss

[57] ABSTRACT

This invention is directed toward joining an optical fiber to a waveguide on a silicon or silica substrate. In a preferred embodiment, a discontinuity such as a notch is provided in the substrate along each side of a waveguide. The notches, which extend back from the end of each waveguide form air gaps between the ends of adjacent waveguides. Now, when an optical fiber is butt coupled to a waveguide on a substrate with adhesive, the notches at either side of the waveguides prevent adhesive from flowing along the edge of the substrate and onto the end of an adjacent waveguide. In addition, the adhesive flows around and encapsulates the substrate projections defined by the notches along the ends of the waveguide to provide a sturdy butt connection.

6 Claims, 5 Drawing Sheets

METHOD AND APPARATUS FOR CONNECTING AN OPTICAL FIBER TO A STRIP WAVEGUIDE

TECHNICAL FIELD

This invention relates to an optical interconnect and more particularly to coupling an optical fiber to an end of a strip waveguide of a doped silica film formed on a silicon or silica substrate.

BACKGROUND OF THE INVENTION

One method of fabricating integrated optical components is by the deposition of doped silica waveguides formed on a doped silica film which had been deposited on a silicon substrate. This technology, referred to as "silica on silicon," has the potential to make optical devices which are smaller in size, are of greater complexity, and are potentially lower in cost than discrete optical devices which are fabricated from fiber and micro-optic components.

A variety of passive optical components have been made using silica on silicon technology in which optical waveguides are formed using a phosphosilicate glass (P-doped silica) core. In one fabrication method, the waveguides are deposited on a base layer call "hipox" formed by the oxidation of silicon under high pressure steam. The core is then covered with a thin cladding layer of $SiO_2$. Devices built using this technology include compound Bragg reflectors, multiplexers, adiabatic polarization splitters, array star couplers and the like. In another fabrication method, doped silicon film is formed on a silica substrate.

At the present time, phosphosilicate glass core waveguides of integrated optical devices made using silica on silicon technology are normally butt coupled to input and output optical fiber by means of a bonding material such as epoxy, UV-adhesive and/or, in some instances, a potting material. The substance used to join the waveguides of the optical device to the optical fiber also serves the necessary step of filling in a gap which may exist at the butt coupling.

A current method of attaching an optical fiber to silica on silicon wafer is by first wetting the end of the fiber with a drop of suitable adhesive and then bringing the fiber into contact with the wafer. The adhesive, after drying and solidifying, holds the fiber to the wafer. The result, however, is not satisfactory for two reasons. First, the butt connection is too weak for most purposes. Second, the adhesive normally flows onto the end of an adjacent waveguide thus causing further problems when an attempt is made to attach that waveguide to an optical fiber.

The publication entitled "Fiber Attachment for Guided Wave Devices", by E. J. Murphy, Journal of Lightwave Technology, Vol. 6, No. 6, June 1988, presents a review of the status of fiber attachment to guided-wave devices. Current methods for achieving low fiber-to-waveguide-to-fiber insertion losses are discussed and techniques for aligning and permanently attaching fibers are described.

In this publication the author asserts that an appropriate bonding material and method of application is critical as it determines both the stability and reliability of the fiber-waveguide joint. He notes that UV curing adhesives are widely used because they can be cured rapidly without compromising the fiber alignment. However, UV-adhesives have questionable stability when subjected to environmental extremes in temperature, pressure or humidity and, therefore, the joints may not be sufficiently stable. Equally important, even a slight deterioration in the optical properties of the epoxy can seriously impair the transmission of optical signals through it.

The publication concludes with the statement that a major challenge of the next decade will be to develop a reliable and robust fiber attachment and packaging technology. Four years after the publication, the problems of joining an optical fiber to a silicon wafer still exist.

This invention is directed toward solving the problem of providing a reliable and robust fiber-waveguide butt coupling arrangement.

SUMMARY OF THE INVENTION

This invention is directed toward joining an optical fiber to a waveguide on a silicon or silica substrate. In a preferred embodiment, a discontinuity such as a notch is provide din the substrate along each side of a waveguide. The notches, which extend back from the end of each waveguide form air gaps between the ends of adjacent waveguides. Now, when an optical fiber is butt coupled to a waveguide on a substrate with adhesive, the notches at either side of the waveguides prevent adhesive form flowing along the edge of the substrate and onto the end of an adjacent waveguide. In addition, the adhesive flows around and encapsulates the substrate projections defined by the notches along the ends of the waveguide to provide a sturdy butt connection.

DETAILED DESCRIPTION

Figure 1:
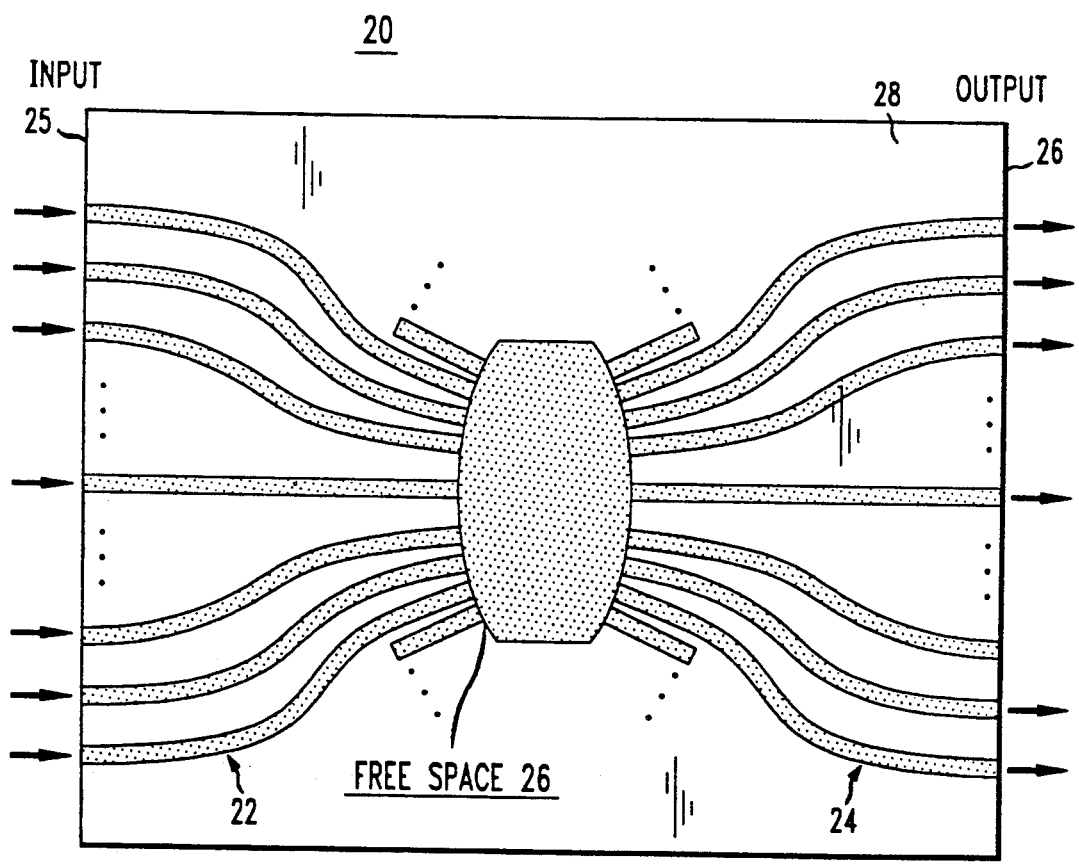
FIG. 1 is a schematic representation of a multichannel integrated star coupler made using silica on silicon technology.

Referring to FIG. 1, there is illustrated a multichannel integrated optics star coupler 20 fabricated on a silicon substrate using silica on silicon ($SiO_2Si$) technology. The illustrate coupler is disclosed more fully in IEEE Photonics Technology Letters, Vol. 1, No. 8, August 1984, pages 241-243 by C. Dragone et al. The coupler consists of a symmetric arrangement of two arrays of waveguides 22, 24 separated by a region of planar free space 26 which occupies the center of the coupler. In operation, an input signal to any one input waveguide 22 is distributed equally among all of the output waveguides 24.

The coupler is made from P-doped silicon films formed on a silicon substrate as discussed in J. Lightwave Technol., Vol. 6, pages 1011-1015, 1988, "Integrated Four-Channel Multi/Demultiplexer Fabricated With Phosphorus Doped SiO₂ Waveguides on Si" by B. H. Verbeek et al.; and J. Lightwave Technol., Vol. 7, pages 308-313, 1989.

In use, input and output optical fibers (not illustrated) are coupled to the ends of the waveguides of the star coupler. The attachment of the input and output optical fibers to the ends of the waveguides 22,24 at the edges 25,26 of the substrate 28 is probably the most difficult challenge encountered in packaging optical devices. The ends of the optical fibers and the waveguides on the substrate, after they are aligned, must be coupled to each other with tolerances that are at least ten times more demanding than tolerances required for integrated circuit packing. When the optical fibers are each attached individually, it is important that the adhesive used to attach an optical fiber to a waveguide not flow onto and contaminate the optically polished end face of an adjacent or neighboring waveguides. If a liquid adhesive, e.g., epoxy, is used, it must be carefully applied and/or cured locally to prevent it from coating an adjacent waveguide end face with cured adhesive. In addition, because the dimensions of the end faces of the waveguide and the optical fiber are very small, the fiber is held in place over a very small surface area. This results in a butt joint of minimum strength. In some instances, this problem can be remedied by potting the optical fibers to the substrate with strength members as a final step. A problem with this procedure is that stress-induced misalignments can occur. For those applications in which only one fiber is needed or the waveguides are widely spaced, capillary tubes or jewels having a centered hole can be used for increased surface area and stability.

Figure 2:
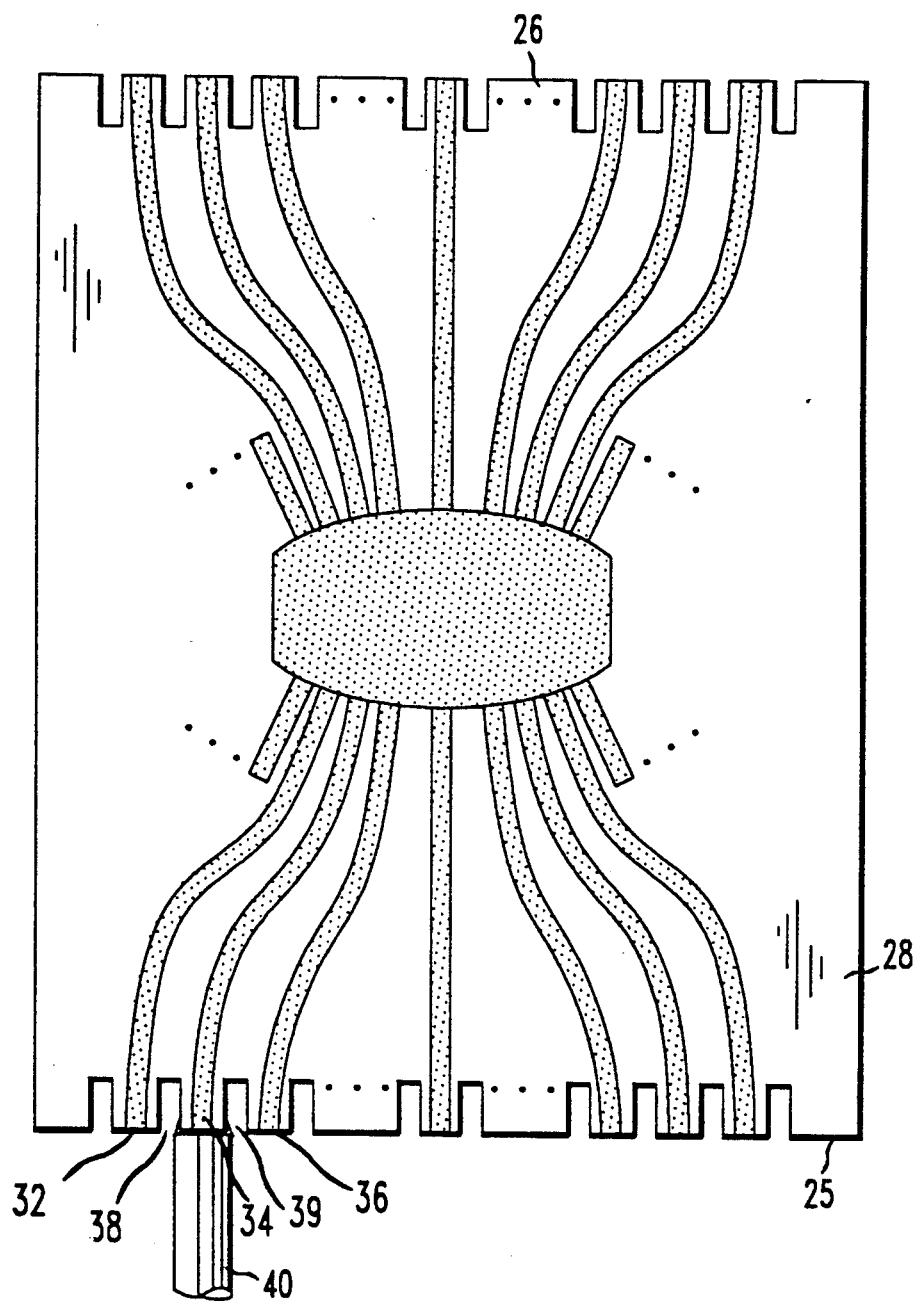
FIG. 2 is a schematic representation of a star coupler made using silica on silicon technology and having notches which extend back from the ends of waveguides on a silicon wafer in accordance with the principles of the invention.
Figure 3:
FIG. 3 is an end view of the device of FIG. 2.

Referring to FIGS. 2 and 3, there is illustrated a multichannel integrated optic star coupler similar to that of FIG. 1 modified to enable the waveguides on the silicon substrate to be butt coupled to optical fibers in accordance with the principles of the invention. FIG. 2 is a top view of the star coupler on a substrate 28, and FIG. 3 is an end view of the substrate of the star coupler. The dimension so fan N×N star coupler, where the first N represents the number of input ports and the second N represents the number of output ports, such as is illustrated in FIG. 1, is about 1.5×3.0 cm with a thickness of about 0.55 mm when N is 19. The spacing of the waveguides at the input end 25 and at the output end 26 is about 250 μm.

Looking at FIG. 2, the substrate 28 contains notches positioned on either side of the waveguides to physically isolate the end of each waveguide from the ends of adjacent waveguides.

More specifically, a notch 38 is located between adjacent waveguides 32 and 34; and another notch 39 is located between adjacent waveguides 34 and 36. The notches 38,39 extend from the edge 25 of the substrate back along each side of the waveguide 34. The purpose of the notches 38,39 is to physically isolate the end of waveguide 34 and its underlying substrate form the ends of waveguides 32,36 and the portion of the substrate upon which they reside.

Thus, the end of each waveguide and the substrate upon which it resides is physically isolated from the ends of adjacent waveguides and the substrate upon which those ends reside.

An optical fiber 40 that is to be coupled to a waveguide end, for example, waveguide 34, is, in one embodiment, dipped into or coated with an adhesive such as an epoxy, an UV adhesive or the like. The coated end of the optical fiber 40 is then aligned with and butted against the end of the waveguide 34 and the underlying substrate. Thus, the waveguide 34 and the optical fiber 40 are positioned end to end.

Figure 4:
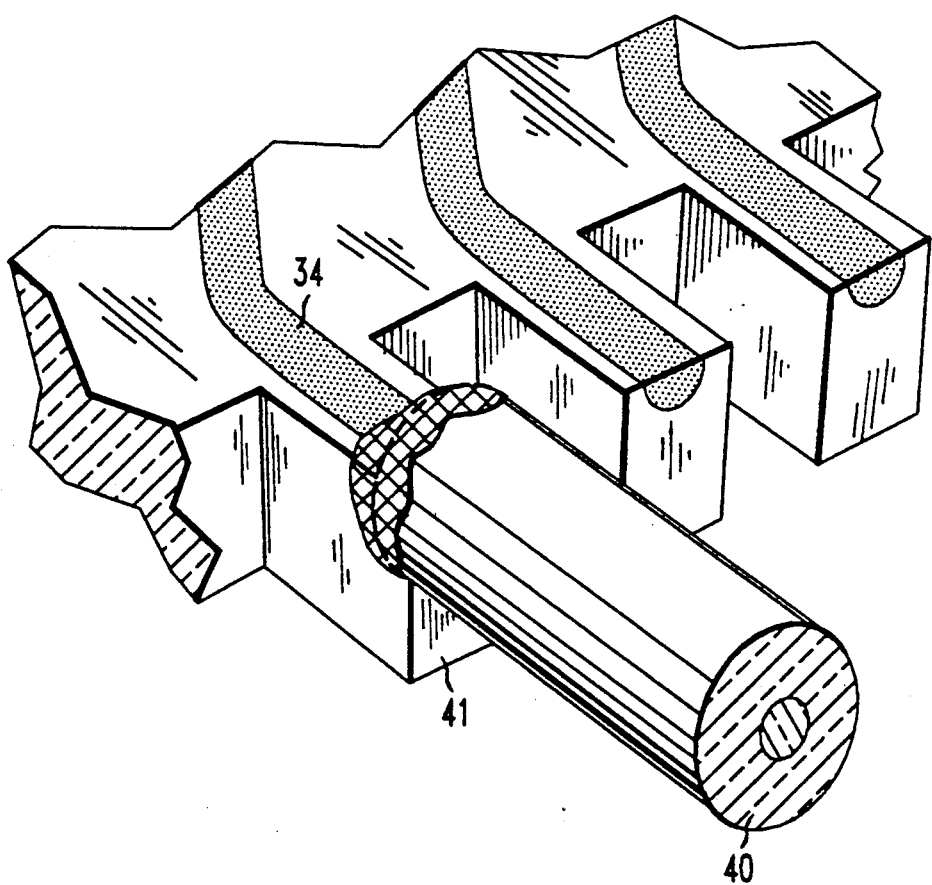
FIG. 4 is a schematic illustration of an optical fiber butt coupled to a waveguide on a silicon wafer in accordance with the principles of the invention.

The adhesive on the end of the optical fiber spreads over the end of the optical fiber nd around the top and sides of the waveguide and supporting end of the substrate. Reference is here made to FIG. 4 which is an enlarged schematic of optical fiber 40 being butt coupled to waveguide 34. It is to be noted that the adhesive flows around and encapsulates the end of optical fiber 40, and also flows around and encapsulates the top, sides and front end surfaces of the tooth 41 formed by the notches 38. It is also to be noted that the notches 38,39 prevent the adhesive from reaching and covering adjacent waveguides on the substrate. If desired, drying and hardening of the adhesive can be expedited with appropriate means. The mechanical bond of the optical fiber butt coupled to the end of the waveguide is both reliable and robust as a result of two ends being encapsulated by the adhesive.

Figure 5:
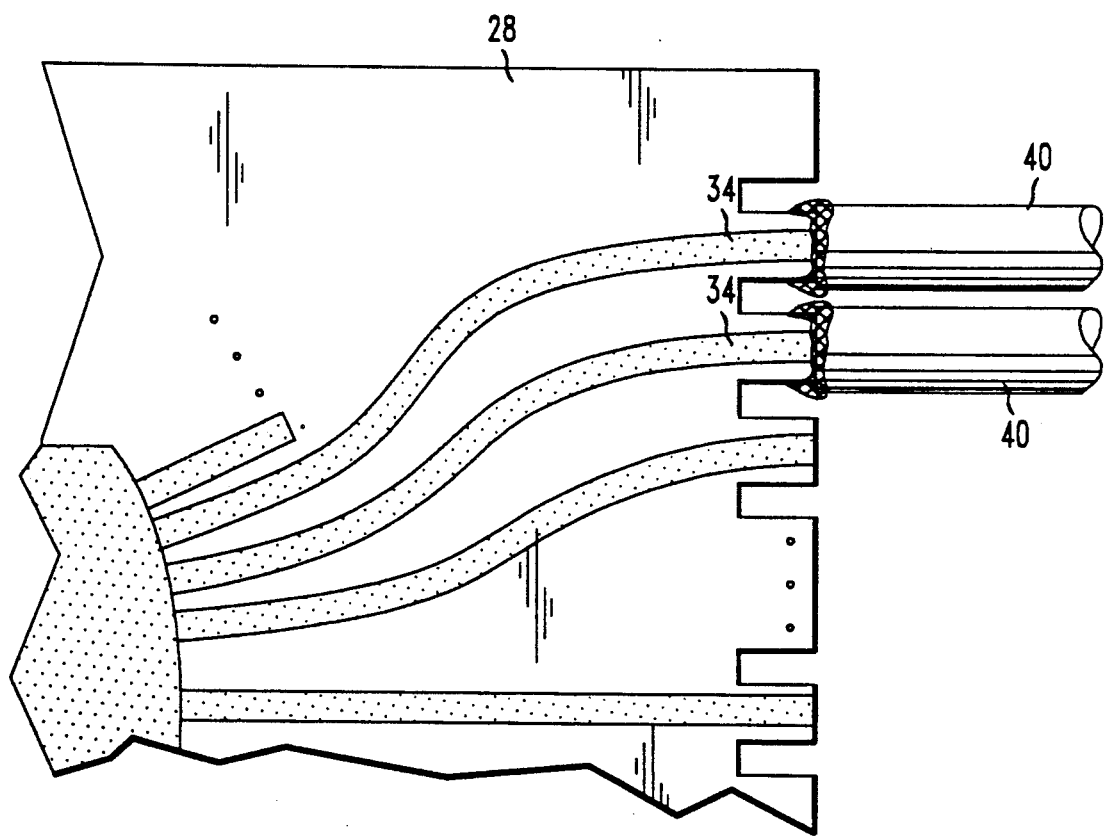
FIG. 5 is a top view of FIG. 4.
Figure 6:
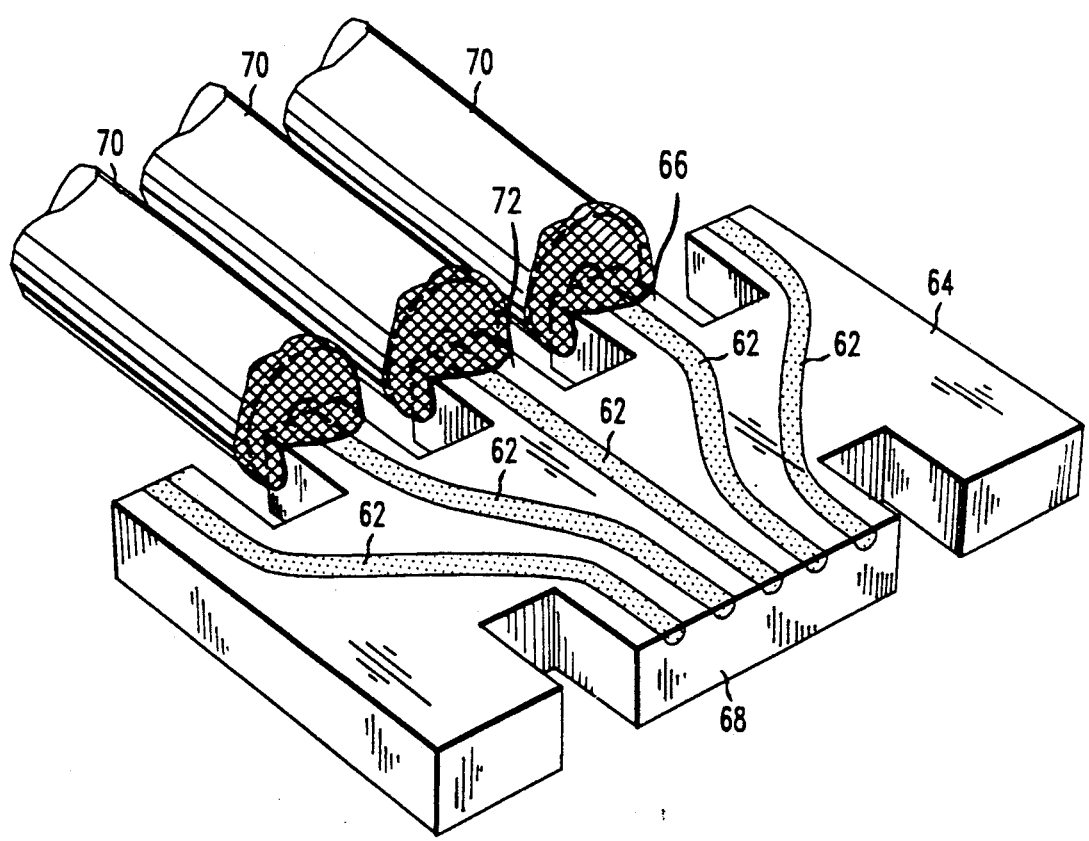
FIG. 6 is an illustration of a connector utilizing the principles of the invention for coupling optical fibers to waveguides on a silicon wafer where the spacing of the waveguides is equal to or less than the diameters of the optical fiber.

FIG. 5 is a top view of FIG. 4 illustrating the encapsulation of the end of the fiber and the end of the waveguide by the adhesive. In FIGS. 5 and 6, the width of the tooth on which the waveguide resides is shown as being less than the diameter of the optical fiber. It is to be noted that, in the practice of this invention, the tooth width may be equal to or larger than the diameter of the optical fiber.

Optical fiber in use today has a diameter of substantially 125 μm. Therefore, obviously, the waveguide spacing must exceed 125 μm. However, in some instances, smaller waveguide spacing may be needed to obtain reduced device dimensions. For example, if the spacing between waveguides can be reduced, then the number of devices that can be present on a given wafer can be increased. An immediate benefit can be a reduction of cost, particularly when several mask levels are required as, for instance, when filters or multiplexers include Bragg reflectors, or suitable $Si_3N_4$ layers are used to insure polarization independent transmission. In some instances a device may be so large that it will not fit on a standard wafer unless the waveguides spacing is substantially reduced. For example, large N×N couplers are difficult to realize with current technology (using wafers of 4-5 inches and bends of 15 mm) because of the large dimensions of the concentrators when N is greater than 50. Clearly, therefore, a suitable connector is needed to permit waveguides with spacings that re less than the diameters of optical fibers to be connected to optical fibers.

Referring to FIG. 6, there is illustrated such a connector 60. Connector 60 can comprise doped silica waveguides 62 formed on a doped silica film which was deposited on a silicon substrate 64. The waveguide 62, at one end 66 are spaced apart a distance which is greater than the diameters of the optical fibers. At the other end 68 of the substrate, the waveguides are spaced apart a distance which is equal to the spacings of the waveguides of the device (not illustrated) to which it is to be joined.

In operation, a device having closely spaced waveguides is aligned with and butt connected to the end 68 of connector 60, the waveguides 62 on the connector 64 having been spaced apart to mate with corresponding waveguides on the connecting device. The connector 60 can be physically coupled to the device with a suitable bonding material such as epoxy, UV adhesive, or the like. The substance used to join the waveguides of the connector to the waveguides of the device also fill the gaps which may exist at the butt coupling.

The other end 66 of the connector 60 is connected to optical fibers which may be either input optical fibers or output optical fibers. The optical fibers 70 are butt connected to the waveguides 62 at the end 667 of the substrate 74 in the similar manner that waveguide 34 is butt connected to optical fiber 40 as illustrated in FIG. 4. In the embodiment illustrated in FIG. 6, it was assumed that space restrictions at the end 66 are not critical and, therefore, the width of each tooth was made to have a width that is greater than the diameter of the abutting optical fiber 70.

What has been described is merely illustrative of the application of the principles of the present invention. Other arrangements and methods can be implemented by those skilled in the art without departing from the spirit and scope of the present invention.

We claim:

1. Apparatus comprising
   a substrate supporting on a surface at least two waveguides,
   notches located in said substrate on either side of a first end of each waveguide and which extend back from the ends of the waveguide to form an air gap between the ends of adjacent waveguides to prevent an adhesive applied to the end of a waveguide from flowing along the edge of the substrate to the end of an adjacent waveguide, said first ends of said waveguides being spaced apart a distance that is greater than the diameter of an optical fiber,
   an optical fiber positioned in butt relationship with the first end of one of said waveguides located between the notches,
   said optical fiber being securely joined to said waveguide with adhesive which covers and encapsulates the end of the optical fiber and the end of the optical waveguide including the end of the substrate supporting the optical waveguide.

2. A method of connecting at least two waveguides on a substrate to at least two optical fibers comprising the steps of:
   forming notches in the substrate on either side of a first end of each waveguide and which extend back from the ends of the waveguide, said notches forming an air bag between the ends of adjacent waveguides to prevent adhesive applied to an end of a waveguide from flowing along the edge of the substrate and onto the end of an adjacent waveguide said waveguides at said end of the substrate being spaced apart a distance that is greater than the diameter of an optical fiber, said substrate located between adjacent notches having a dimension that is less than the diameter of the optical fiber,
   aligning in butt relationship an end of one of the optical fibers with an end of one of the waveguides located between notches,
   causing adhesive to spread over the end of the optical fiber and the end of the substrate supporting the end of the waveguide causing the adhesive to encapsulate the end of the optical fiber and the end of the waveguide and supporting substrate, and
   maintaining said ends in aligned butt relationship until the adhesive sets.

3. The method of claim 2 wherein
   said waveguides at said first end are spaced apart a distance that is greater than the diameter of the optical fiber, and
   said substrate located between adjacent notches has a dimension that is equal to the diameter of the optical fiber.

4. The method of claim 2 wherein
   said waveguides at said first end are spaced apart a distance that is greater than the diameter of the optical fiber, and
   said substrate located between adjacent notches ha a dimension that is greater than the diameter of the optical fiber.

5. The method of claim 2 wherein
   second ends of said waveguides on said substrate are spaced apart a distance that is less than the diameter of the optical fiber.

6. The method of claim 3 wherein
   second ends of said waveguide on said substrate are spaced apart a distance that is greater than the diameter of the optical fiber.

* * * * *